(12) United States Patent
Halevy-Politch et al.

(10) Patent No.: US 7,126,730 B2
(45) Date of Patent: Oct. 24, 2006

(54) ELECTRO-HOLOGRAPHIC LENS

(76) Inventors: Jacob Halevy-Politch, 8a Hantke Street, Haifa, 34606 (IL); Uriel Fischer, 4 Golda street, Haifa, 34982 (IL)

( * ) Notice: Subject to any disclaimer, the term of this patent is extended or adjusted under 35 U.S.C. 154(b) by 0 days.

(21) Appl. No.: 11/027,429

(22) Filed: Dec. 30, 2004

(65) Prior Publication Data

US 2005/0146761 A1 Jul. 7, 2005

(30) Foreign Application Priority Data

Dec. 30, 2003 (IL) ........................................ 159653

(51) Int. Cl.
*G03H 1/00* (2006.01)
*G03H 1/08* (2006.01)
*G02B 5/32* (2006.01)

(52) U.S. Cl. ................... 359/15; 359/1; 359/3; 359/19; 349/202

(58) Field of Classification Search ................. 359/15; 349/202
See application file for complete search history.

(56) References Cited

U.S. PATENT DOCUMENTS

| | | | | |
|---|---|---|---|---|
| 4,490,981 | A * | 1/1985 | Meckler | 60/641.15 |
| 4,947,825 | A * | 8/1990 | Moriarty | 126/685 |
| 5,119,214 | A * | 6/1992 | Nishii et al. | 359/7 |
| 6,604,436 | B1 * | 8/2003 | Lewandowski et al. | 73/865.6 |
| 6,833,938 | B1 * | 12/2004 | Nishioka | 359/15 |
| 2002/0126332 | A1 * | 9/2002 | Popovich | 359/15 |

* cited by examiner

*Primary Examiner*—Fayez G. Assaf
(74) *Attorney, Agent, or Firm*—Shalom Wertsberger; Saltamar Innovations

(57) ABSTRACT

An electro-holographic lens device comprising: an active layer made from a transparent photo-refractive material, whose refractive index may be locally modified by locally applying an electric field; an array of electrodes in a predetermined density, provided adjacent the active layer for locally providing electric fields across an array of predetermined locations in the active layer; and a control unit for applying and controlling application of electric fields in a dynamically controllable predetermined locations for creating a holographic fringe pattern across the active layer.

31 Claims, 14 Drawing Sheets

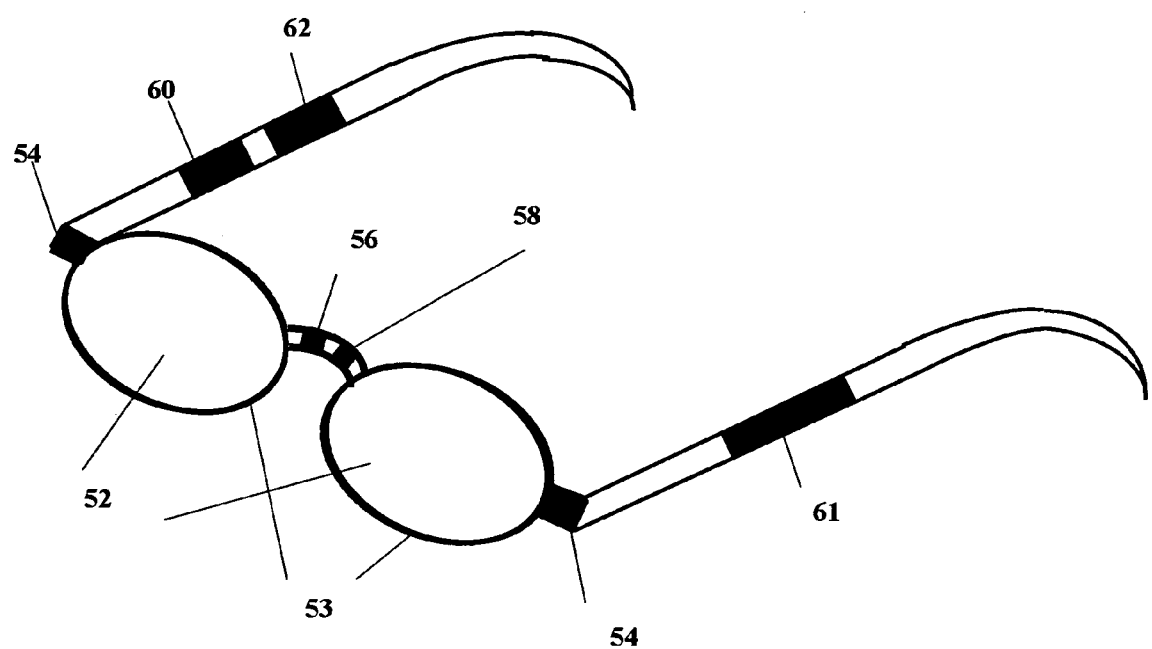
Fig.15
Fig. 16
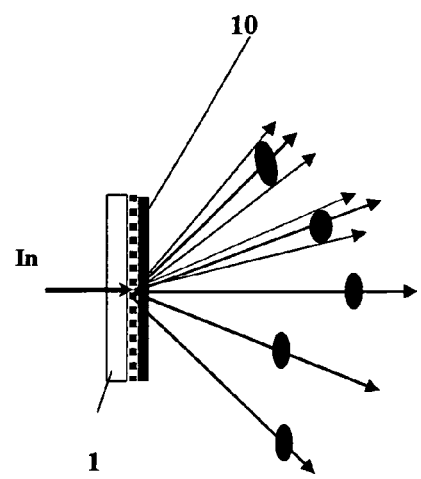

ELECTRO-HOLOGRAPHIC LENS

FIELD OF THE INVENTION

The present invention relates to holography. More particularly it relates to a dynamically produced and controllable electro-holographic lens.

BACKGROUND OF THE INVENTION

Holography is known as a two-step process: recording and reconstruction. In the recording step a hologram is recorded, i.e. interference between two waves, with a mutual degree of coherence in space and time. These beams are the "object beam" (arriving from the object toward the recording material) and the "reference beam" (directly illuminating the recording material). After the recording step the recording material is usually processed (chemically or otherwise) in a manner that creates the hologram. In the reconstruction step a reconstruction of the hologram is performed, usually by illuminating the hologram with a beam equivalent to the reference beam or the object beam. Employing this method of illuminating the hologram, allows viewing the 'source' of the other beam, i.e. the image of the object (which can be a "virtual", or a "real" object), or the image of the reference beam (usually a point source).

Holography was developed as an analog device, operating in many ways like a lens. As digital methods have been developed, the scientific community started to search for possible ways to create a hologram and also reconstruct it digitally. The reconstruction process was the first one to be performed, since it is simpler and also independent of its recording.

By performing an interference between a spherical wave, emerging from a point source (i.e. through a pinhole), and a plane wave—a basic hologram is produced. It is possible to produce these two waves in a coaxial manner, or at a certain angle between them. Since both waves originate from the same radiating source (with a certain spatial and temporal degree of coherence), it is possible to achieve a good mutual coherence between them, if their paths are within the coherence length of the radiating source. If reconstruction is performed by a plane wave, similar to the one applied during the recording process, one obtains a virtual image of the point source, that acts as a diverging (negative) lens and, at the same time, a real image for a convergent one (positive lens).

The focal length of this lens and its area are functions of the geometrical recording conditions and also the recording and reconstructing frequencies (i.e. wavelengths). Therefore they are spatially and temporally frequency selective. Holography was developed for various applications, among them for reconstructions with white light and in real-time.

Holography is also used for collecting solar energy, where a concentrating holographic lens is used. The holographic lens is provided with a multiple holographic patterns each corresponding to a specific elevation and location of the sun, so that as it travels in the sky different patterns go into action each one corresponding to a particular solar location (see U.S. Pat. No. 4,490,981 (Meckler)).

Real-time reconstruction holography has the advantage of observing variations of the object (static and dynamic movements of its surface, changes in the index of refraction in the material under test, etc.). Certain photosensitive materials change their thickness or indices of refraction (commonly named 'phase materials') instead of their opacity. To these materials belong also films of dichromatic gelatin and photoconductor-thermoplastic films. Using these materials, it is possible to record a hologram at one time and erase it at some other time, and then make another hologram [Collier R. J., Burckhardt C. B., and Lin L. H., "Optical Holography", Academic Press, (1971)]. Approaches towards an electrically controllable hologram were performed in the past. Liquid crystal (LC), which was produced at different heights, and excited by electrical means is one example [Slinger C., et. al., "Electrically controllable multiple, active, computer-generated hologram", Optics Letters, 22, (14) 1113–1115, (15 Jul., 1997)]. Another example is adaptive computer generated hologram in LC, using hybrid feedback systems and interpolation method [Yoshikawa N., et. al., "Adaptive computer-generated hologram with hybrid feedback system", 1966 International Topical Meeting on Optical Computing, Technical Digest, Vol. 1, 224–5]. Another example is a switchable Fresnel lens [Yun-Hsing Fan, Hogwen Ren, and Shin-Tson Wu, "Switchable Fresnel lens using polymer-stabilized liquid crystal", Optics Express, 11, (23), 3080–3086, (17 Nov. 2003)]. However, until now a process for continuously recording and reconstructing a hologram in 'real-time' has not been achieved.

The present invention aims at providing a holographic lens, capable of performing processes by digital methods, which simulate in real-time the recording and reconstruction of a conventional holographic lens.

Another object of the present invention is the provision of a dynamically controllable holographic lens that changes its viewing direction in real-time, while maintaining the spatial positions of the spectral foci. This device is based on simulating the intensity (fringes) obtained at every point in the holographic plane from the incident beams, by means of computer generated processing. Thus changing, by electrical means and in real time, a property (like index of refraction) of a photo-refractive material, and therefore obtaining a Real-Time Computer Generated Hologram (RTCGH). This lens is of a type named hereinafter Real-Time Computer Generated Holographic Lens (RTCGHL). Such a lens can be applied, for example, for concentration of sunlight, as it travels in the sky to a fixed point, in order to transform it to electrical energy.

Another object of the present invention is the provision of a device that tilts the refracted beam in real-time, named hereinafter Real-Time Computer Generated Holographic Tilt (RTCGHT).

Yet additional object of the present invention is the provision of a device that splits the incident beam in real-time into several diffracted beams, named hereinafter Real-Time Computer Generated Holographic Splitter (RTCGHS).

Other objects and advantages of the present invention will become apparent after reading the present specification and reviewing the accompanying drawings.

SUMMARY OF THE INVENTION

There is thus provided, in accordance with a preferred embodiment of the present invention, an electro-holographic lens device comprising an active layer comprising a transparent photo-refractive material, whose refractive index may be locally modified by locally applying an electric field, an array of electrodes in a predetermined density, provided adjacent the active layer for locally providing electric fields across a plurality of predetermined locations in the active layer, and a control unit for applying and controlling application of electric fields in a dynamically controllable predetermined locations for creating a holographic fringe pattern across the active layer.

Furthermore, in accordance with a preferred embodiment of the present invention, the active layer is provided on a substrate.

Furthermore, in accordance with a preferred embodiment of the present invention, the substrate is transparent.

Furthermore, in accordance with a preferred embodiment of the present invention, the substrate is reflective.

Furthermore, in accordance with a preferred embodiment of the present invention, the array of electrodes is laminated for insulation.

Furthermore, in accordance with a preferred embodiment of the present invention, the active layer is made from materials selected from the group of titanium oxides.

Furthermore, in accordance with a preferred embodiment of the present invention, the active layer is made from materials selected from the group of colloidal semiconductors.

Furthermore, in accordance with a preferred embodiment of the present invention, the active layer is made from materials selected from the group comprising: ZnO, $WO_3$, $V_2O_5$, $Ag_2O$, ZnS, CdS, PbS, CuS, $MoS_2$, CdSe, InO and $InSnO_x$.

Furthermore, in accordance with a preferred embodiment of the present invention, the active layer is made from materials selected from the group of electrochromic materials.

Furthermore, in accordance with a preferred embodiment of the present invention, the active layer is made from materials selected from the group of liquid crystals.

Furthermore, in accordance with a preferred embodiment of the present invention, the electrodes are spaced apart in the order of a few microns.

Furthermore, in accordance with a preferred embodiment of the present invention, the device is incorporated in a solar energy concentrator system.

Furthermore, in accordance with a preferred embodiment of the present invention, the device further comprises at least one energy transducer positioned in the optical path from the device, for transforming the irradiated energy directed from the device onto said at least one energy transducer into electricity.

Furthermore, in accordance with a preferred embodiment of the present invention, the device further comprises a sun tracking system for providing on-line feedback to the dynamic control of the device.

Furthermore, in accordance with a preferred embodiment of the present invention, the transducer comprises an array of photovoltaic cells.

Furthermore, in accordance with a preferred embodiment of the present invention, the transducer comprises a thermal conversion unit, such as a Stirling engine.

Furthermore, in accordance with a preferred embodiment of the present invention, said at least one energy transducer comprises at least two energy transducers, for receiving energy irradiations of different wavelengths.

Furthermore, in accordance with a preferred embodiment of the present invention, one transducer is activated by, or highly responsive to UV radiation, and the other transducer is activated by, or highly responsive to IR radiation.

Furthermore, in accordance with a preferred embodiment of the present invention, the device is incorporated in a window.

Furthermore, in accordance with a preferred embodiment of the present invention, the device is incorporated in eyeglasses, serving as at least one lens.

Furthermore, in accordance with a preferred embodiment of the present invention, the eyeglasses further comprise detection means for detecting a distance between the eyeglasses and a viewed object.

Furthermore, in accordance with a preferred embodiment of the present invention, the eyeglasses further comprise detection means for detecting orientation of the eyes of a bearer of the eyeglasses.

Furthermore, in accordance with a preferred embodiment of the present invention, there is provided a method for manipulating optical irradiation comprising: providing an electro-holographic lens device comprising an active layer made from a transparent photo-refractive material, whose refractive index may be locally modified by locally applying an electric field; an array of electrodes in a predetermined density, provided adjacent the active layer for locally providing electric fields across an array of predetermined locations in the active layer, a control unit for applying and controlling application of electric fields in a dynamically controllable predetermined holographic fringe pattern created across the active layer, and producing a dynamically controllable hologram, by locally changing the refractive index on layer of photo-refractive material, in a predetermined holographic fringe pattern, by irradiating optical energy on the electro-holographic lens device.

Furthermore, in accordance with a preferred embodiment of the present invention, the method is used for concentrating solar energy.

Furthermore, in accordance with a preferred embodiment of the present invention, the method further comprises providing at least one energy transducer in an optical path from the electro-holographic lens device, onto which irradiation from the device is directed.

Furthermore, in accordance with a preferred embodiment of the present invention, the method is used for diverging light beams.

Furthermore, in accordance with a preferred embodiment of the present invention, the method is used for converging light beams.

Furthermore, in accordance with a preferred embodiment of the present invention, the method is used for splitting a light beam.

Furthermore, in accordance with a preferred embodiment of the present invention, the method is used for eyesight correction.

Furthermore, in accordance with a preferred embodiment of the present invention, the method is used for spotlighting.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention.

FIG. 15 illustrates eyeglasses for vision correction or vision enhancement incorporating an electro-holographic lens device in accordance with a preferred embodiment of the present invention.

FIG. 16 illustrates an electro-holographic lens device in accordance with a preferred embodiment of the present invention, exhibiting composite splitting, diverging and converging.

DETAILED DESCRIPTION OF PREFERRED EMBODIMENTS

Figure 1A:
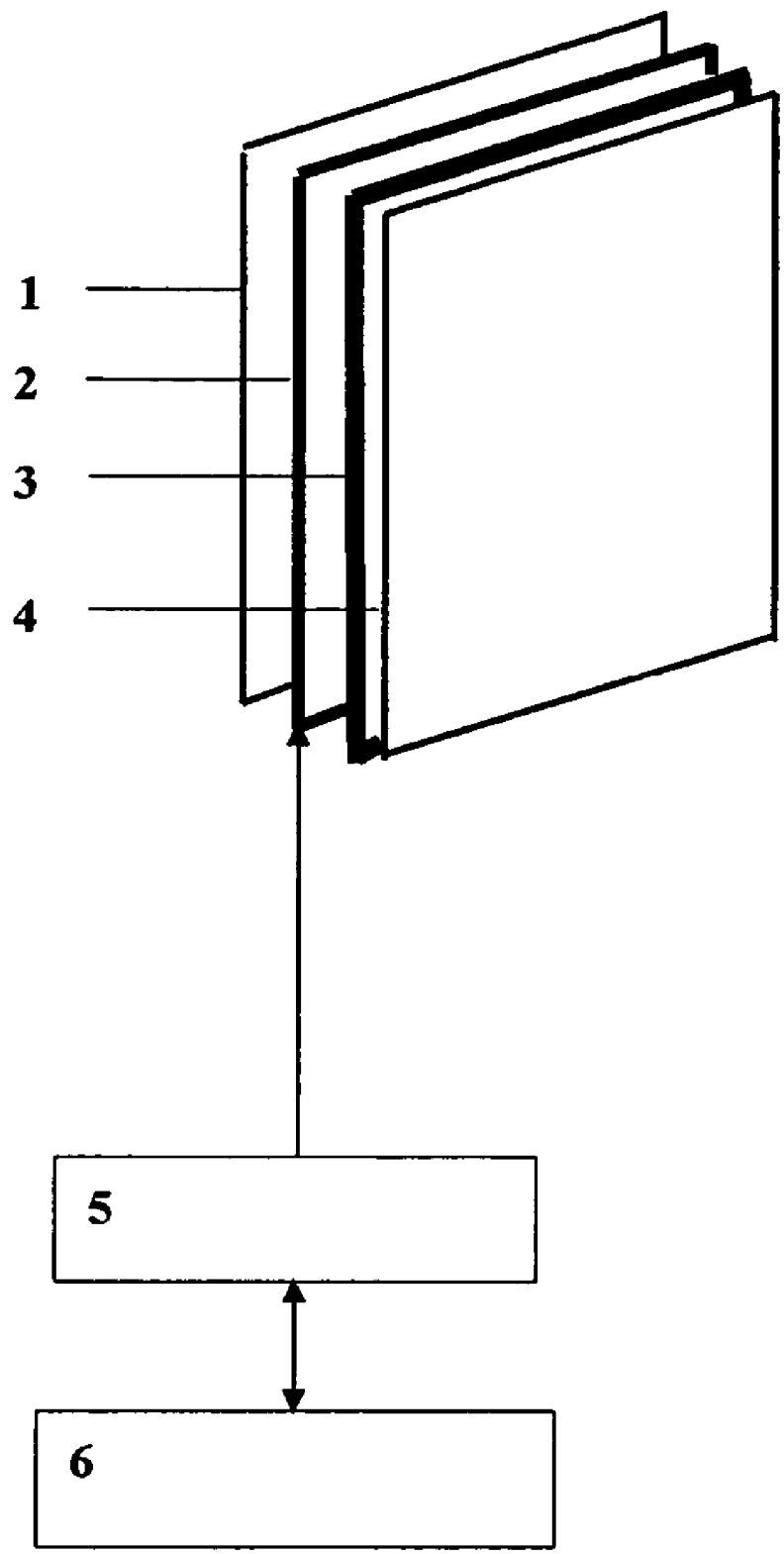
FIG. 1a is a schematic diagram of an electro-holographic lens device, in accordance with a preferred embodiment of the present invention.

There are several methods to digitally reconstruct a hologram, and all of them operate on a similar principle: a photo-detector collects the emitted light from a hologram, directly or through a lens, or through a narrow slit, or their combination. The electronic signal at the output of the photo-detector is proportional to the light intensity falling on its area, which is processed and interpreted using a mathematical algorithm. The regular processing functions include noise reduction, thus increasing SNR (signal to noise ratio), edge sharpening and contrast improvement. At every detection area, the coordinates and light intensity are digitally recorded, and usually at a later stage they are processed.

A digital hologram was introduced at a later stage, since it required a more powerful computer—larger memory and faster processing power. For this purpose, Complex Field Amplitudes (CFA) of the sum of the two beams is calculated, and from it—the intensity distribution, which contains the fringes as well. This describes usually the interference phenomena between two mutually coherent beams, calculated at every point in the plane of the hologram.

Using digital methods to construct a holographic lens have the advantage of a careful design and construction, with required properties that are unobtainable by analog means.

Moreover, by developing such a lens, with a suitable electro-optic material and electronic circuitry that supports it, it is possible to construct and continuously change, in real time, the parameters of such a holographic lens (and therefore its properties), rendering it a dynamically controlled holographic lens.

A main aspect of the present invention is the provision of a dynamically controlled electro-holographic lens comprising an active layer of a photo-refractive material whose refractive index may be altered electrically by applying an electrical field. A grid of electrodes is provided adjacent to the active layer, in a two-dimensional arrangement, presenting a two-dimensional array of points at which local provision of electric field in a predetermined manner is facilitated. By providing electric fields at predetermined points, the refractive index is changed in a known manner. This way a digital hologram is formed. Modifying these local electric fields, which are generated at the grid points in a predetermined manner, modifies the pattern that creates the digital hologram. Thus the electro-holographic lens is dynamically controlled.

In a preferred embodiment of the present invention, a real-time computer generated holographic device that can tilt a refracted beam in a desired direction—according to the voltages applied to its circuitry and to the electrodes of the grid in the device is introduced (RTCGHT). The process of tilting the refracted beam is achievable by a Computer Generated Holographic Lens (CGHL) that operates as an off-axis lens. This means that a plane incident wave, which propagates along the principal axis of a positive lens, is not focused along this axis, but off it. This process is also achievable in real-time, activated by voltages that are controlled in real time.

In yet another embodiment of the present invention, a real-time computer generated holographic device that can split the incident beam in two or more directions—according to the voltages applied to its circuitry, is introduced (RTCGHS). The process of splitting the refracted beam into a plurality of beams is achievable by a Computer Generated Holographic Lens (CGHL) that operates as on-axis or an off-axis lens, where the modulation depth reaches the non-linear region. This means, for example, that a plane incident wave which propagates along the principal axis of a positive lens, is not focused along this axis only, but also, symmetrical to the principal axis, at several angles—according to its modulation depth. This process is also achievable in real-time, activated by voltages that are controlled in real time.

In yet another embodiment of the present invention, in order to follow the relative position of a moving light source and at the same time to preserve the spatial position in the focal plane, a device combining characteristics from a RTCGHL and a RTCGHT is introduced. For example, in an imaging optical system, the object performs a displacement in a certain direction in a perpendicular plane to the principal axis. Therefore the image will perform a similar displacement in the image plane (which is also perpendicular to the principal axis), but in the opposite direction. These displacements in the image plane are in some cases too large. In order to reduce them, one has to introduce a RTCGHT. By introducing a suitable voltage to the RTCGHT, one can achieve a minor displacement in the image plane, or even to keep it at its position, in spite the movements of the light source or an object.

In still another embodiment of the present invention, in order to follow the relative position of a moving light source and at the same time to preserve the spatial and spectral positions in the image plane at several areas, a composite device combined from a RTCGHS, RTCGHL and a RTCGHT is introduced. For splitting requirements of the incident light-source/object, a RTCGHS was introduced, activated by voltages controlled in real time, as explained earlier. Still, the angularly split beams will change their positions (while keeping their angular separation), when the object/light-source performs an angular displacement. In order to preserve the positions of the split images at the same (or almost the same) location in the image plane, a RTCGHT device is introduced, activated by voltages controlled in real time.

Reference is now made to FIG. 1 illustrating an electro-holographic lens device, in accordance with a preferred embodiment of the present invention.

The device, generally denoted by numeral 10 (see FIG. 2) comprises an active layer 3 of photo-refractive material whose index of refraction may be locally modified at a certain local small area, by applying an electric field onto that small area. The active layer is provided on a substrate 1, which may be made from any transparent material. By "transparent" is meant that the material is relatively transparent to the anticipated optical irradiation (for example glass, but other materials may be used as well). A grid of electrodes 2 is provided, either within the substrate or over it (in the figure the electrodes are provided over the substrate). For insulation reasons it is recommended to provide the electrodes coated in a laminate. A protective layer 4 (such as a glass plate, or other suitable transparent material) is provided over the photo-refractive material for protecting purposes.

The electrodes grid is connected to control unit 5, which controls each point ("cell") of the grid, by determining the electric field at each small/local area as that field is provided from the adjacent electrode grid 2. The control unit may include a processor or communicate with a processing unit 6, either programmable or equipped with a program for determining the desired holographic pattern and the timing to be used, cooperatively with control unit 5.

The electro-holographic lens in accordance with a preferred embodiment of the present invention is a digital device, in which optical interferences are performed in a plane perpendicular to the optical axis, between a plane wave and a point source, that are mathematically with mutual coherence. Every active cell of the electro-holographic lens has at least the following information associated therewith: coordinates of the point under investigation; Complex Field Amplitudes (CFAs) of the 'reference' and 'object' beams; their calculated summation and intensity; the transfer function of the activated material (which relates to changes in the indices of refraction) at the area of activation.

The electro-holographic lens of the present invention is implemented using electro-optical photo-refractive material that is activated electronically by means of a mesh grid of transparent electrodes, such as Indium/Tin Oxide (ITO), which are laminated or in any other way supported by the substrate, like glass. At the intersection of two lines of the grid, excitation of the electro-optical material occurs, if subjected to external electric fields, generated by suitable currents that are passed for a predetermined time through these wires.

Figure 1B:
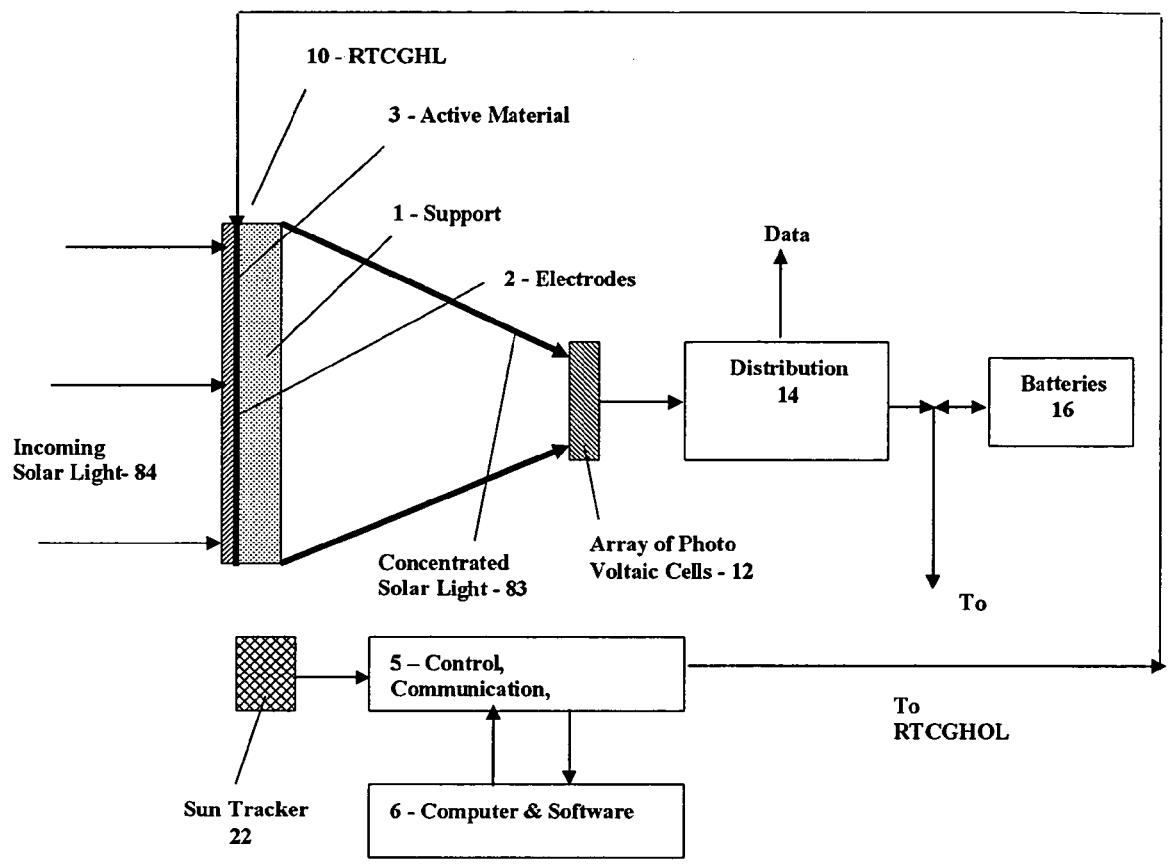
FIG. 1b is a schematic diagram of an electro-holographic lens device incorporated in a solar energy concentrator system.

FIG. 1b illustrates an electro-holographic lens device incorporated in a solar energy concentrator system.

The incoming solar light 84 impinges the electro-holographic lens (RTCGHL) device 10, which is placed in front an array of photovoltaic (PV) cells 12. This electro-holographic lens device 10 concentrates the solar light 83 onto the photovoltaic cell array 12. Electricity generated by the photovoltaic cells is transferred to a distribution system 14, for distribution to consumers (with optional data monitoring), or to storage facilities (batteries 16). This electro-hologram 10 is dynamically monitored and modified by control unit 5 (the unit for control, communication, process and drive 5, which is commanded by a unit that contains a computer with a software 6 and the sun tracker unit 22). The sun tracker 22, which is a device for tracking the position of the sun in the sky, provides angular positioning data to the control unit 5, from which corresponding electric signals are sent to the electro-holographic lens 10, in order to for the lens to optically follow the angular position of the sun, so thus to allow concentration of the solar energy 83 through the electro-holographic lens 10 onto the array of photovoltaic cells 12.

In a preferred embodiment of the present invention the spatial density of the two-dimensional mesh is about 5 by 5 microns. However, higher or lower densities of the mesh fall within the scope of the present invention. Using lower density will cause lower diffraction and therefore the angular resolution will be also lower. Therefore changes in tracking position of the light source/image are also with lower frequency and the spot size in the image/focal plane is larger.

Concentric patterns of rings are implemented in the case of interference as described above. This type of pattern is applied only when the illuminating source (like the sun) is along the optical axis of the system. In any other case, the pattern is of an off-axis type—where the center is more apart as the angle between the sun and the optical axis of the RTCGHL is larger.

The electro-optic photo-refractive material for the electro-holographic lens preferably remains transparent in the whole range of the spectrum of interest, while it is exited electronically. This means that the electronic excitation changes the indices of refraction, as obtained in a "phase hologram".

Preferably, the time required to produce changes in an electro-holographic lens (RTCGHL) 10 is in the range of few milliseconds, in order to follow the path of the illuminating source/image and not to be interfered by the atmospheric perturbations. This process is repeatable, until the control system 5 & 6 defines the angular conditions for which the RTCGHL 10 properties are relatively stable. Then the excitation changes to the new incremental position of the illuminating source, and the described process repeats again.

The active layer 3 may be laid on a substrate 1 such as glass, or any other suitable material, which is also transparent in the spectral range of the illuminating source, like the sun, and is capable of preserving these properties with climate variations (if the device is to be used for solar tracking and concentration of solar energy). The shape of the substrate 1 is preferably planar, but can be of a complex shape as well.

Optionally, the electro-holographic lens 10 (RTCGHL) may be operated in a reflective mode, in which case a transparency is not required. In such case a reflecting materials such as silver is used, which is deposited on the electro-optic material. The reflecting material and the active layer are then inserted between the transparent substrates, like glass. Preferably high reflecting materials exhibiting minimal light absorption are used.

Electro-optic materials with suitable properties to be used for as the active layer in devices in accordance with the present invention include for example, but not limited to the following:

(a) titanium oxides, such as $TiO_2$ (b) colloidal semiconductors, such as: $ZnO$, $WO_3$, $V_2O_5$, $Ag_2O$, $ZnS$, $CdS$, $PbS$, $CuS$, $MoS_2$ and $CdSe$, $InO$ and $InSnO_x$.

(c) electrochromic materials.

(d) liquid crystals.

Figure 2A:
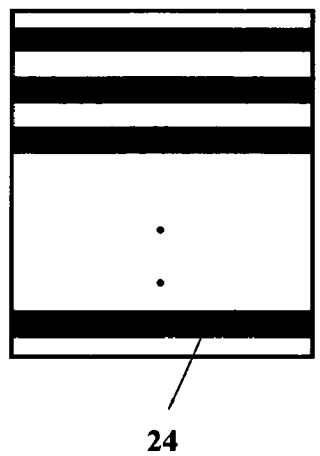
FIG. 2a is a schematic diagram of an embodiment of the present invention, in which the transparent electrodes are located on two different layers. The first layer of a grid of electrodes to be used as activators of the active layer of an electro-holographic lens, in a preferred embodiment of the present invention, in a horizontal orientation.
Figure 2B:
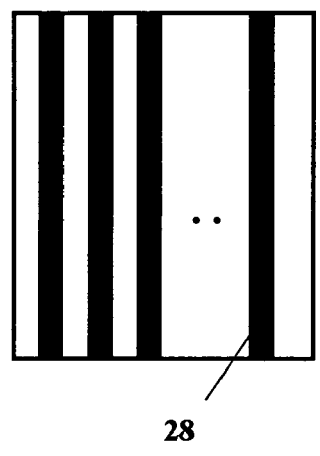
FIG. 2b illustrates a second layer of the grid of electrodes (the first layer is shown in FIG. 2a) to be used as activators of the active layer of an electro-holographic lens, in another preferred embodiment of the present invention, in a vertical orientation.

FIG. 2a and FIG. 2b illustrate, separately two adjacent layers of electrodes arranged in a two-dimensional grid (in the example the electrode grid orientations are horizontal and vertical in an orthogonal manner, but this is not a rigid requirement. For example, it is possible to use several sets of electrodes oriented in different angle, which will be activated in certain position or sequence according to the light source, each layer separately laminated. FIG. 2a illustrates a first layer of a grid of electrodes to be used as actuators of the active layer of an electro-holographic lens, in a preferred embodiment of the present invention, in a horizontal orientation. FIG. 2b illustrates a second layer of the grid of electrodes (the first layer is shown in FIG. 2a) to be used as activators of the active layer 3 of an electro-holographic lens 10, in a preferred embodiment of the present invention, in a vertical orientation 26. Substantially parallel, horizontal electrodes 24 are laminated, and substantially parallel vertical electrodes 28 are laminated too. Both laminated sets of electrodes are superposed to obtain the grid.

Figure 2C:
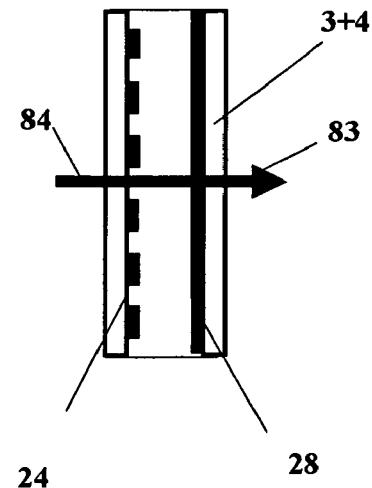
FIG. 2c illustrates a typical optical path of a light ray through the grid-mesh and also through the photo-refractive material, which is located between the electrodes.

These substrates 1 are transparent to the desired bandwidth of the electromagnetic incident energy 84, like the visible light. As incident light 84 passes through the electro-holographic device 10 a typical optical path of a beam takes it through cells 30 of anon-activated grid, as is shown in FIG. 2c.

Figure 3:
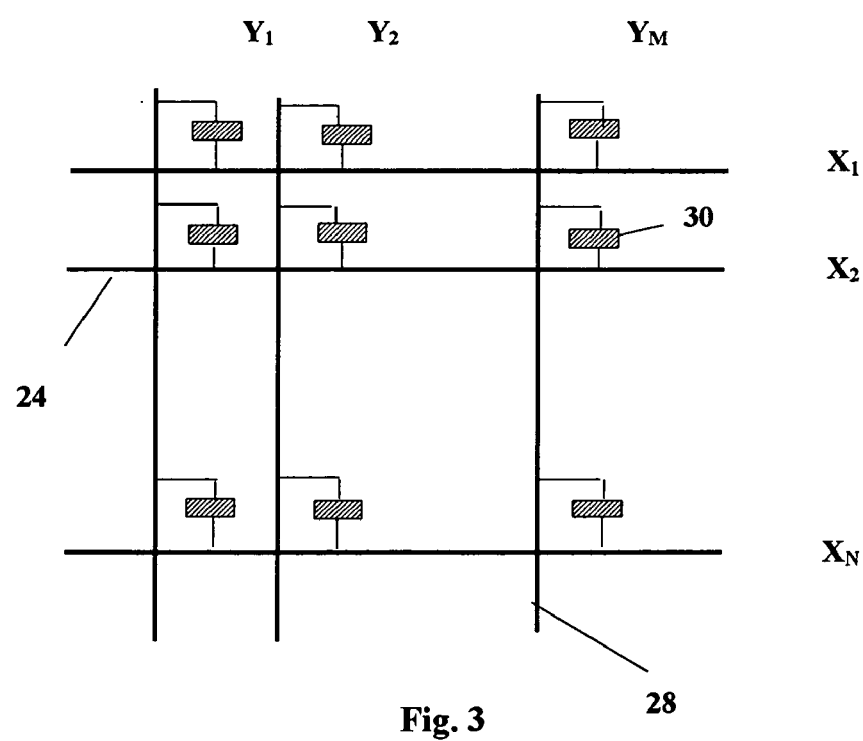
FIG. 3 illustrates the driving electronics of a simple driving scheme for an electro-holographic lens in accordance with a preferred embodiment of the present invention.

Accordingly, voltages applied to specific electrodes, in accordance with a predetermined holographic pattern, activate predetermined cells 30 to form a predetermined pattern. FIG. 3 illustrates the driving electronics of a simple driving scheme for an electro-holographic lens in accordance with a preferred embodiment of the present invention. Here the dot (cell) 30 represents the activated photoelectric material in that location.

Figure 4:
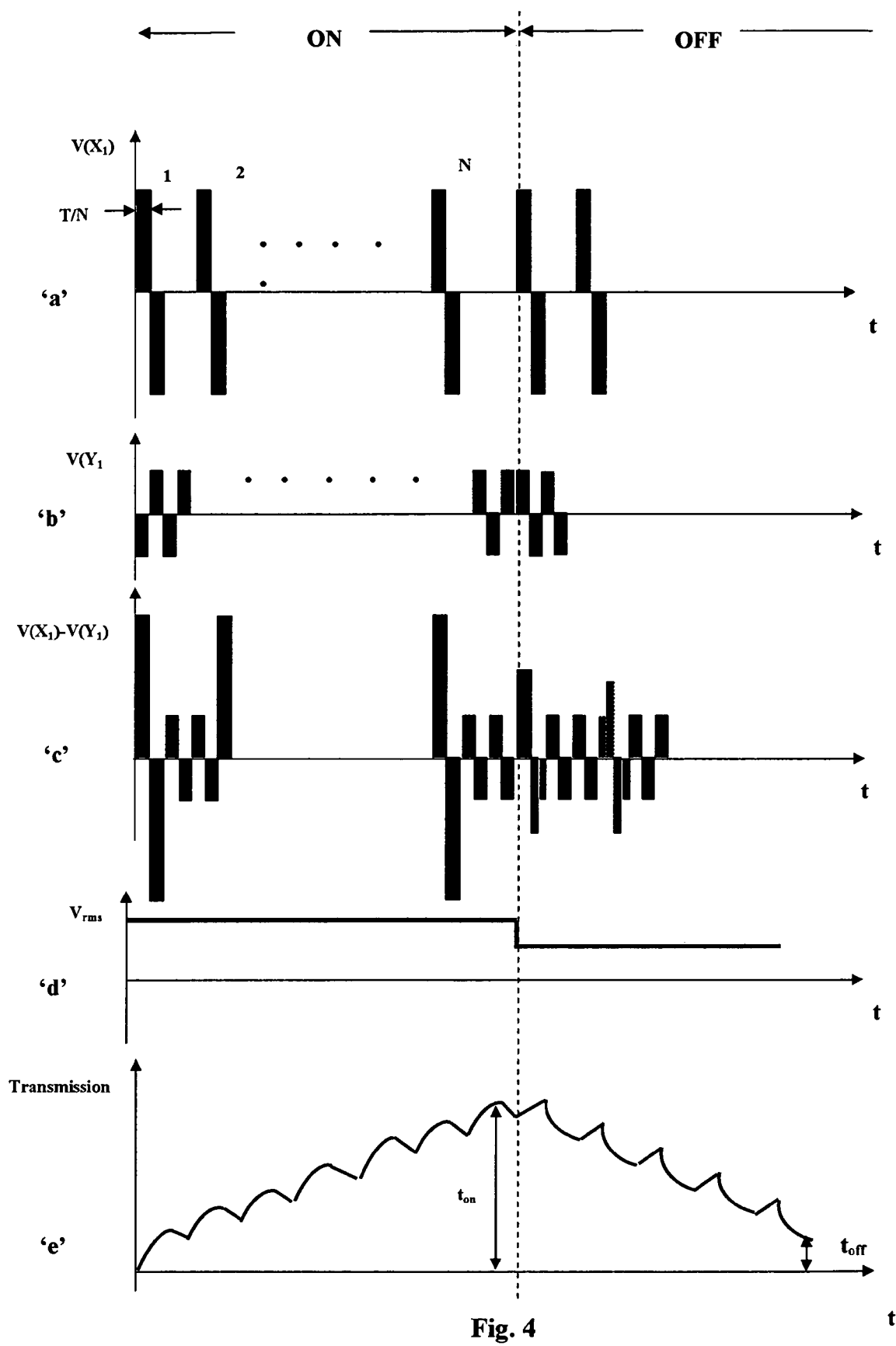
FIG. 4 illustrates an example of waveforms applied at a given point ("dot" and "cell" are synonyms in the context of the present invention) with a simple driving system of an electro-holographic lens device, and the corresponding transmission of incident light through it.

FIG. 4 describes the waveforms obtained at a certain cell of the device, as a function of time, in which the voltage $V(x_i)$, is applied to the electrode 'i' and its orientation is in the 'x' direction (segment "a"). During the time 'T' (half period), the cell is 'ON'. Since there are N pulses, their width is T/N, if their period is 2T/N. Segment "b" describes the voltage $V(y_j)$ as a function of time. This voltage is applied to the electrode 'j' and its orientation is in the 'y' direction. Segment "c" describes the subtracted voltages $[V(x_i)-V(y_j)]$ at the cell as a function of time, while Segment "d" describes their rms (root mean square) values. Segment "e" describes the transmission of the cell as a function of time, and which is due to the signals (voltages), which are described in FIGS. 4a and 4b. The time sequences of the pulses that propagate through the electrodes in the x and y directions enable to excite separately, at a certain time a certain point, i.e. changing its index of refraction. Thus by exciting suitably dots/cells in a pre-calculated formation, a phase hologram is created. Such a hologram is stable over the required period of time, by taking into account the persistence properties of the photoelectric material and the pulse repetition frequency (PRF) of the excitation signal. This method of 'timing excitation' is known and is merely given here as an example of the control of the grid. Alternative control methods (for example separate electrical contacts at each cell, which is a valid method, yet rather cumbersome) may be implemented.

Figure 5:
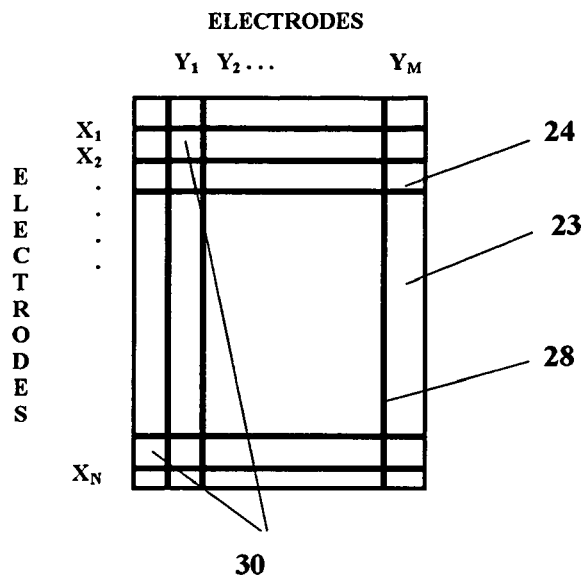
FIG. 5 illustrates another embodiment for a single layer grid of electrodes used as actuators of the active layer, which dot (cell) is in the rectangle between the electrodes in the x and y directions, thus performing an electro-holographic lens device according to the present invention.
Figure 6:
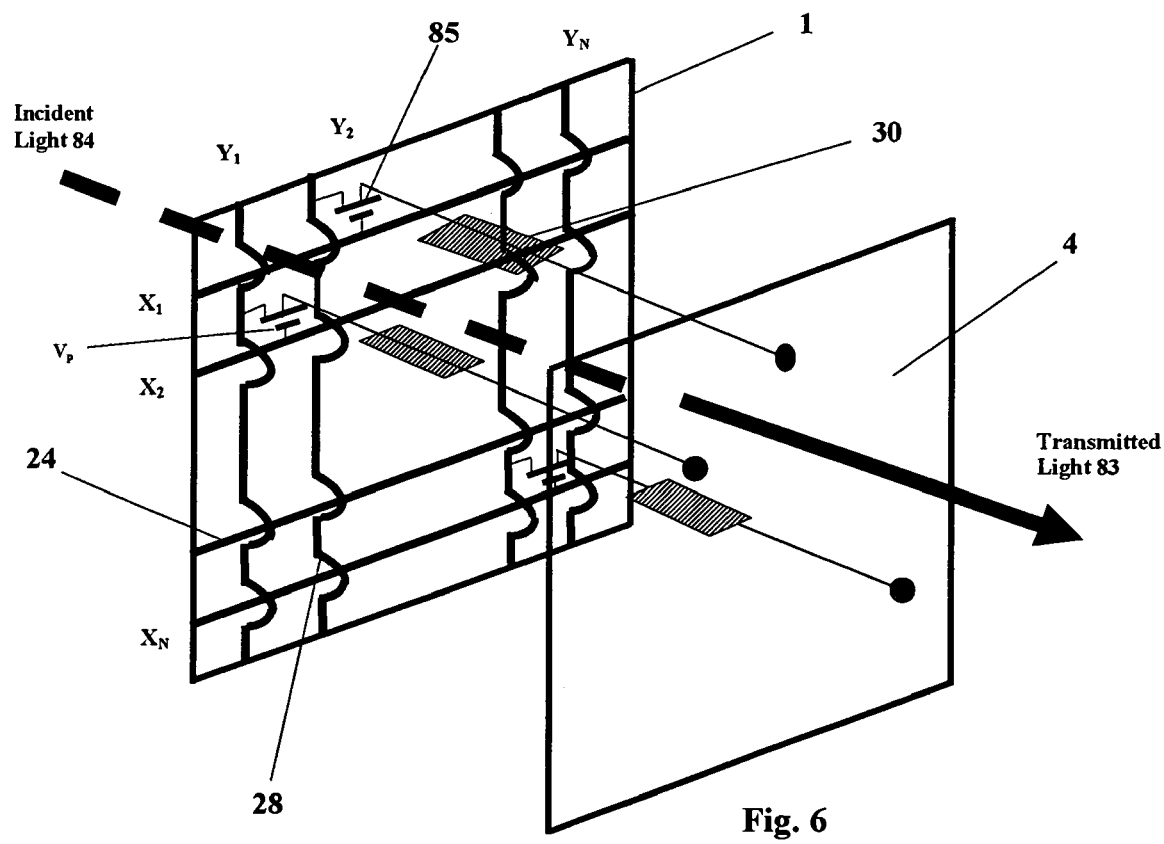
FIG. 6 depicts a suggested electronic driving scheme for each of the dots (cells), performing integrally an electro-holographic lens device according to the present invention.
Figure 7:
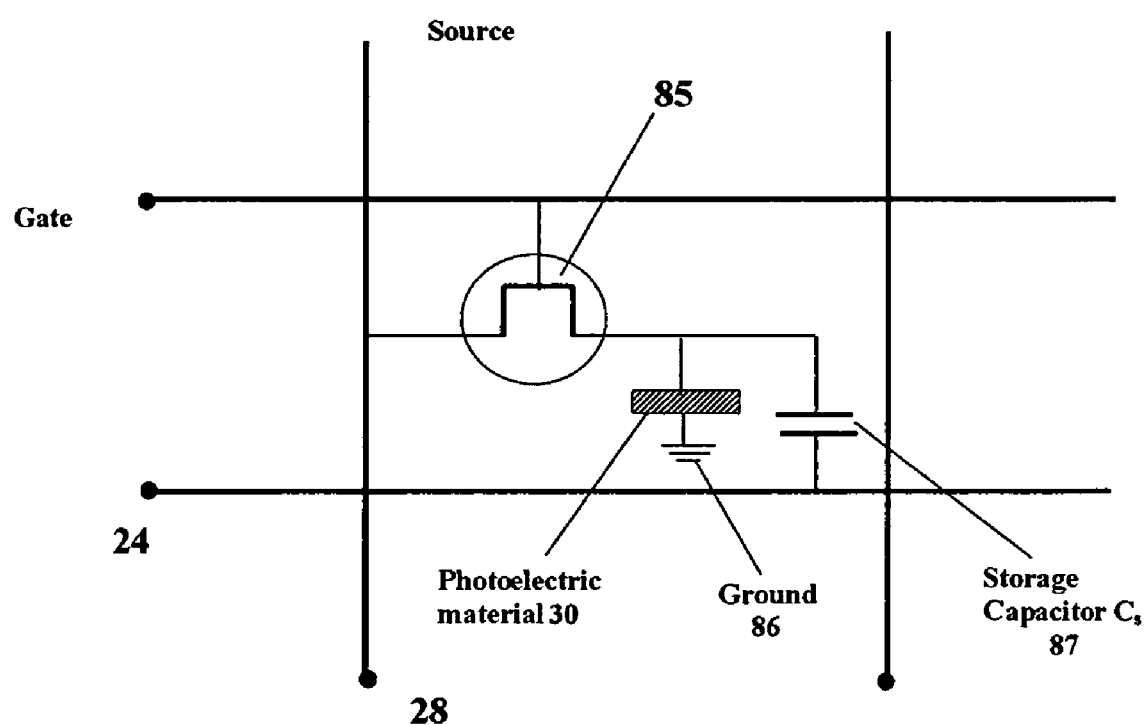
FIG. 7 illustrates detail of the suggested electronic driving scheme of FIG. 6, referring to a single point. This electronic circuit contains an active device (like a transistor) and a storage capacitor (to prevent voltage ripples and keep a smooth voltage over the cell), which cause to the photoelectric material in the cell to be transparent or opaque to the incident light beam.
Figure 8:
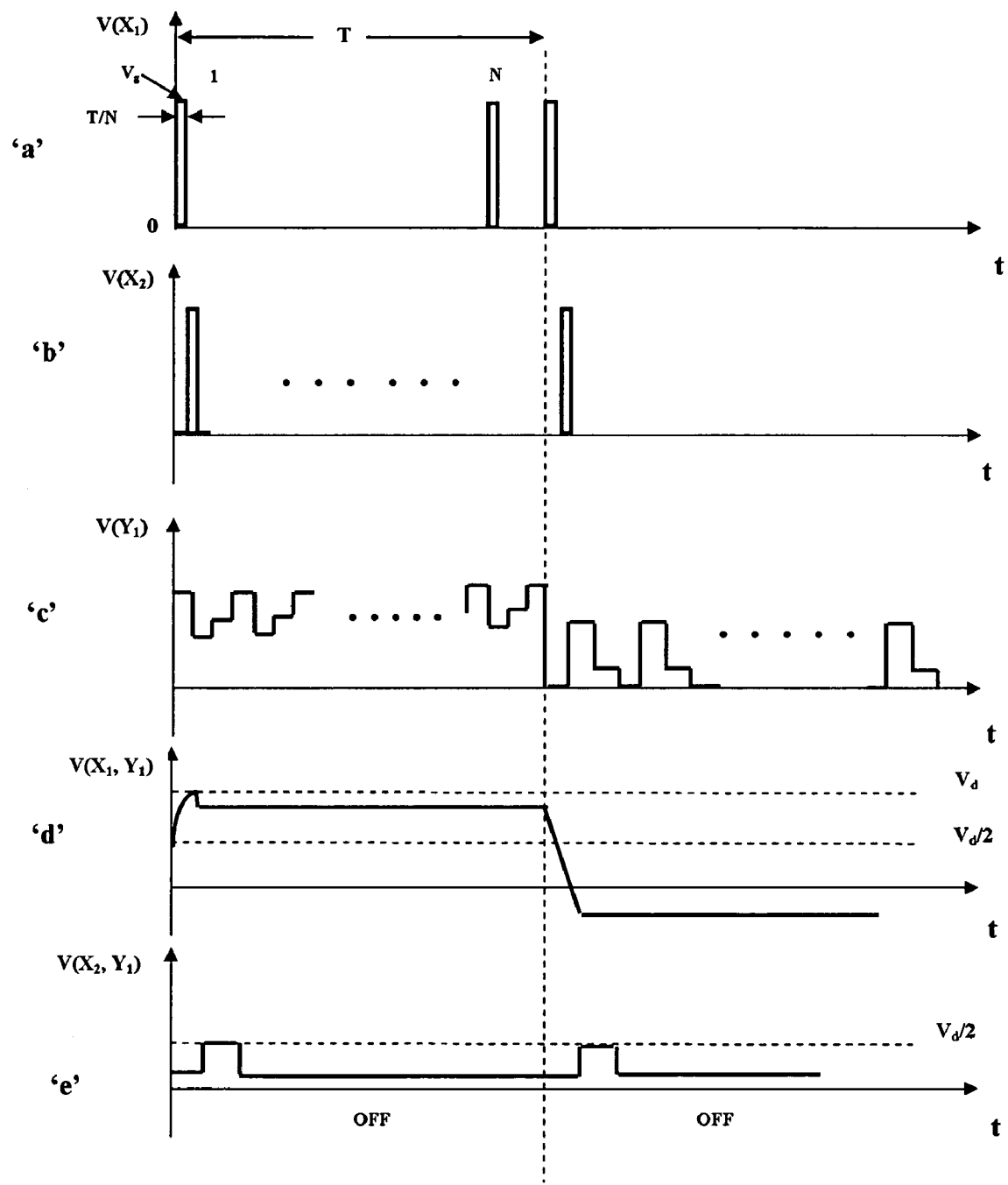
FIG. 8 illustrates suggested waveforms applied in the electronic circuitry of an electro-holographic lens device according to the present invention. The differences in time sequences of the pulse trains in the $X_1$ and $X_2$ electrodes relative to the $Y_1$ electrode, cause to a combination of $X_1$ and $Y_1$ pulses to be a positive voltage during the time 'T' (that is altered accordingly) and as the voltage becomes smaller than $V_d/2$ or even negative—as described after the part 'T'—the index of refraction of the photo-electric material is almost unchanged, however for the combination of $X_2$ and $Y_1$ it is below the threshold level $V_d/2$ for both cases, and therefore the index of refraction of the photo-electric material is unchanged.

Other embodiments of a driving system for a device in accordance with the present invention are illustrated in FIGS. 5, 6, 7 and 8. The mesh of electrodes, which are arranged in a perpendicular manner, are deposited in the same laminate 23 (FIG. 5). Moreover, in this system an active device is applied on the same laminate 23, as the electrodes 24 and 28, and which is described principally in FIGS. 6 and 7. The active device (FIG. 7) contains a transistor 85 and a capacitor 86, and it activates the electro-refractive material 30 (like Liquid Crystal). The incident light 84 is transmitted 83 through this material 30 and due to the applied voltage it forms in the photo-refractive material 30 the required configuration. This phenomenon is also described on the micro level, i.e. the dots (elementary areas) 30. They are produced on the laminate, and are activated each using the required voltage $V_p$, by means of specific electrodes that belong to the groups of electrodes 24 and 28. Performing this activation, the desired fringes that describe the electro-optic hologram are created. A detailed description of the active dot is described in FIG. 7. It contains a transistor 85, a capacitor 87 and a photo-refractive electro-optic material 30. The waveforms in the active dot circuitry are described in FIG. 8. Segment "a" describes the voltage $V(X_1)$ as a function of time. The maximum amplitude of the voltage is $V_\tau$. If we assume that the 'ON' duration is 'T' and the number of pulses during this period is N, the width of the pulse is therefore T/N, if the period of the pulses is 2T/N. Segment "b" describes a similar voltage, entitled $V(X_2)$, but delayed in time by T/N. Segment "c" describes the voltage in the y-direction and is entitled $V(Y_1)$. Segment "d" describes the vector product of the voltages $V(X_1)$ and $V(Y_1)$, entitled $V(X_1, Y_1)$. From here one can find the time that the dot 30 in 'ON' (for example, transmits the light through it) and 'OFF' (for example does not transmit the light through it). Segment "e" describes the product of the voltages $V(X_2)$ and $V(Y_1)$, entitled $V(X_2, Y_1)$, from which one can see that for these conditions of voltages the dot 30 is all the time in the 'OFF' position (for example, does not transmit the light through it). In a similar manner, the electro-optic material 30 is able to change its polarization properties due to the applied voltage. In such a case, the "ON" condition means that an incident polarized light 84 in a certain direction (for example, vertical polarization) is transmitted 83, while in the "OFF" position the polarization is rotated by 90 degrees and therefore the light can not be transmitted 83. In the case that the incident light intensity 84 is elliptically polarized, the "ON" and "OFF" condition will change the amount of the transmitted light 83. These characteristics of the transmitted light 83 are obtained due to the forced changes in the index of refraction of the photoelectric material 30 with the applied voltage between the electrodes in the x-direction 24 and in the y-direction 28. The scheme of operation, as described in FIGS. 5, 6, 7 and 8 is more efficient and compact, as it is an active device (FIG. 7) and its electrodes 24 and 28 are on the same laminate 23.

Figure 9:
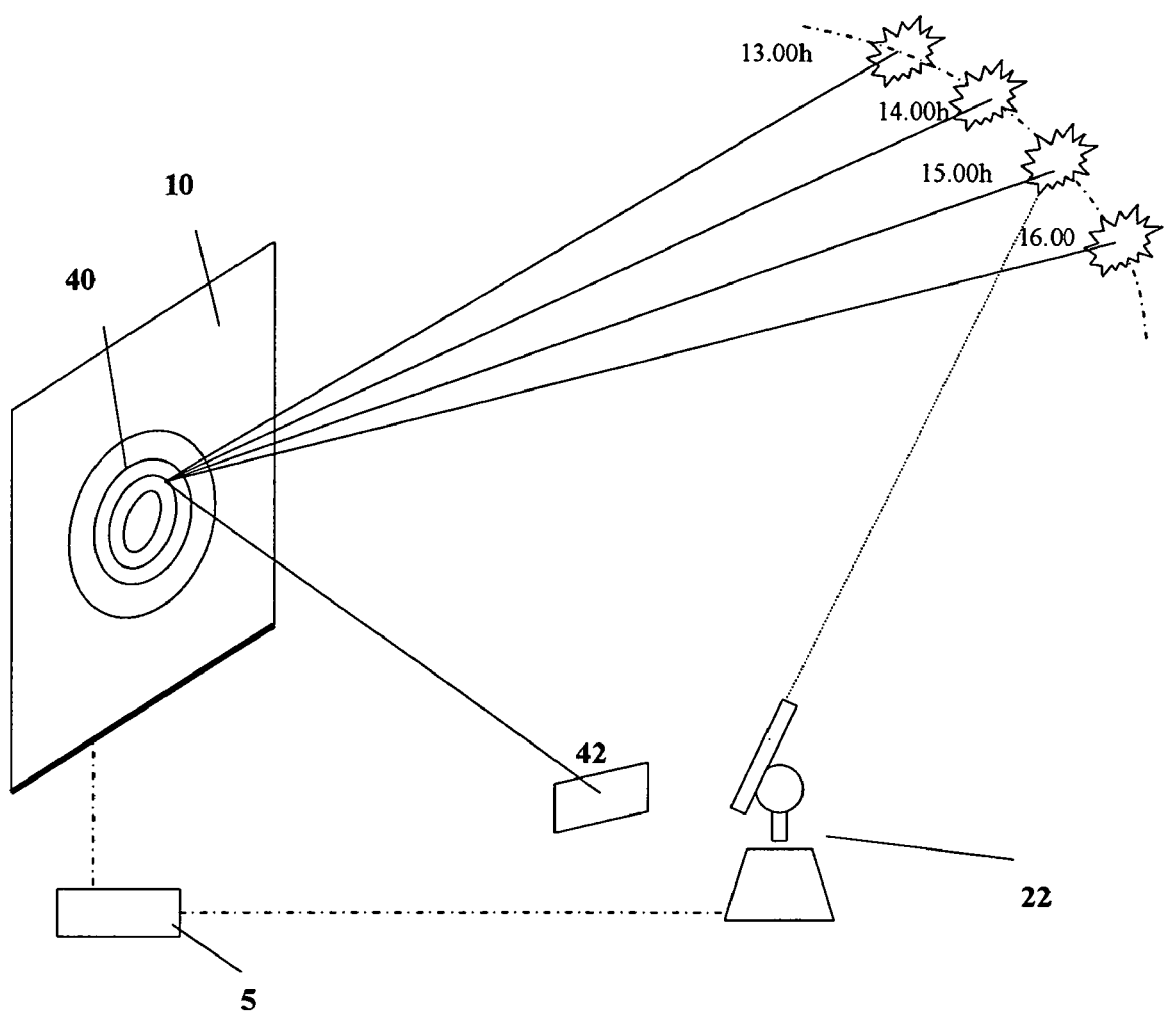
FIG. 9 illustrates a reflective solar energy concentrator system incorporating an electro-holographic lens device in a reflective mode (mirror) in accordance with a preferred embodiment of the present invention.

FIG. 9 illustrates a reflective solar energy concentrator system incorporating an electro-holographic lens device 10 in accordance with a preferred embodiment of the present invention. The electro-holographic lens device 10 is reflective (the back substrate is reflective). As the sun travels across the sky from one position to another (times indicating different positions), its incident radiation is concentrated by the hologram 40 formed on the electro-holographic lens device 10 onto the target 42 (such as a PV array). A sun tracker device, for example a sun tracker 22, as disclosed in U.S. Pat. No. 4,146,784 (Yekutieli), incorporated herein by reference, tracks the position of the sun in the sky and sends information to the control unit, which dynamically modifies the electro-hologram to correspond to the changes in the sun's position in the sky, so that at any given and desired time the sun's energy is concentrated onto target 42.

This scheme can be used for solar PV systems or thermal systems, as a "Stirling Dish" design, but without the need to physically stir the dish (with the engine). The hologram is continuously changing its parameters so that the sun is followed and the light is being concentrated to one fixed target—an engine heated plate or an array of PV cells and also for direct heating of chemical reactions.

There are several alternative simple ways to handle the sun's movement and projected position. One method can be based on known data such as information on the geographic location of the system and information on the sun location (planetary charts). This is a well known and a used technology in solar heliostat fields.

Since the control software is continuously fed by the exact position of the light source, there will be no need, in solar thermal systems, for example, to insert correction factors to seasonal changes or other reasons for inaccuracy caused by pre-installed positioning methods.

Figure 10:
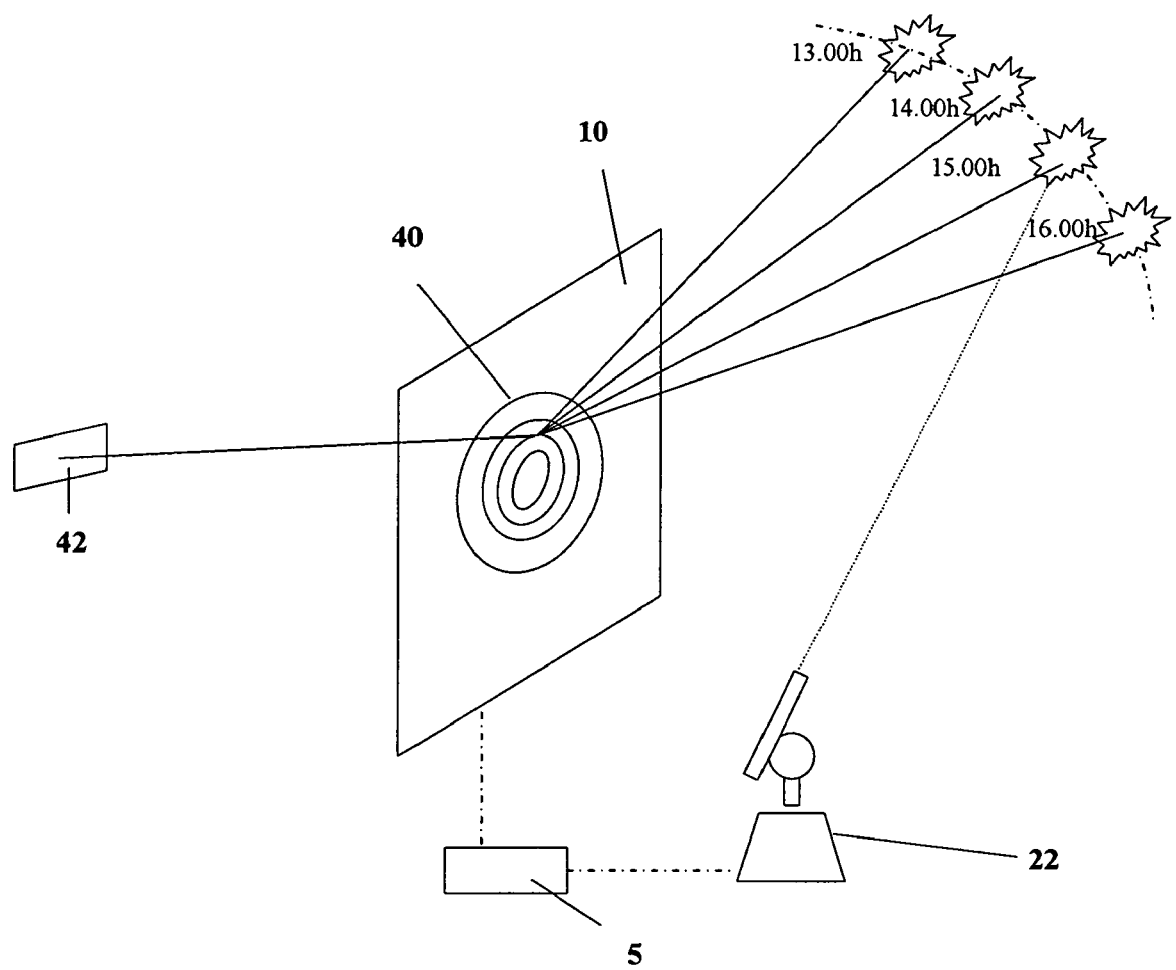
FIG. 10 illustrates a refractive solar energy concentrator system incorporating an electro-holographic lens device in accordance with a preferred embodiment of the present invention.

FIG. 10 illustrates a refractive solar energy concentrator system incorporating an electro-holographic lens device 10, in accordance with a preferred embodiment of the present invention. In this embodiment the electro-holographic lens device is transparent throughout and the hologram formed on the device is used to direct and converge the sun's energy onto the target 42, which is located behind the device.

Figure 11:
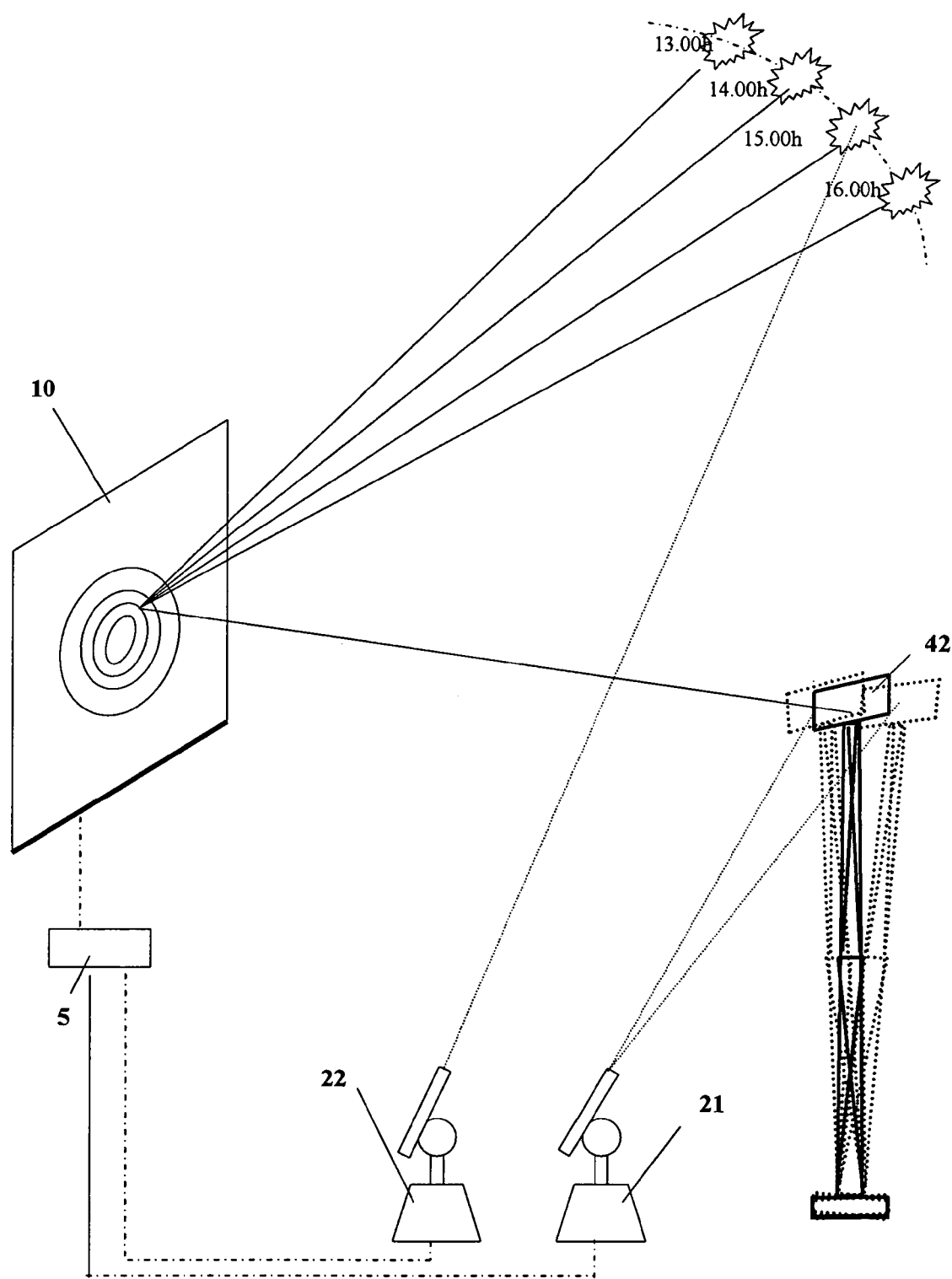
FIG. 11 illustrates a reflective solar energy concentrator system incorporating an electro-holographic lens device in a reflective mode (mirror) in accordance with a preferred embodiment of the present invention, capable of tracking both light source and target.

FIG. 11 illustrates a reflective solar energy concentrator system incorporating an electro-holographic lens device in accordance with a preferred embodiment of the present invention, capable of tracking both light source and target.

The heliostats in a prior-art solar field are usually made of many very thin glass plates slightly caved-in into a circular or parabolic shape, in order to direct the collected sunlight to a single small area, located on a solar tower head. All the heliostats in a solar field follow the sun in a way that the collected light will be directed back to the top of the solar tower, which holds a single target for the multiple heliostats. By using the proposed device of the present invention, the collectors can be made from flat plates. Furthermore, the heliostats can be stationary, while the electronic control unit changes the holographic patterns dynamically, according to the position of the light source, and corresponding to the momentary position changes of the tower top, hosting the target. If the tower is made of steel it is likely to sway in windy conditions. A tracker 21, tracks the position of the target (PV array) on the tower and sends position information to the control unit 5, which corresponds by producing a suitable hologram on the electro-holographic lens device, so that at any given instance of time the sun's energy is concentrated on the swaying target.

Figure 12:
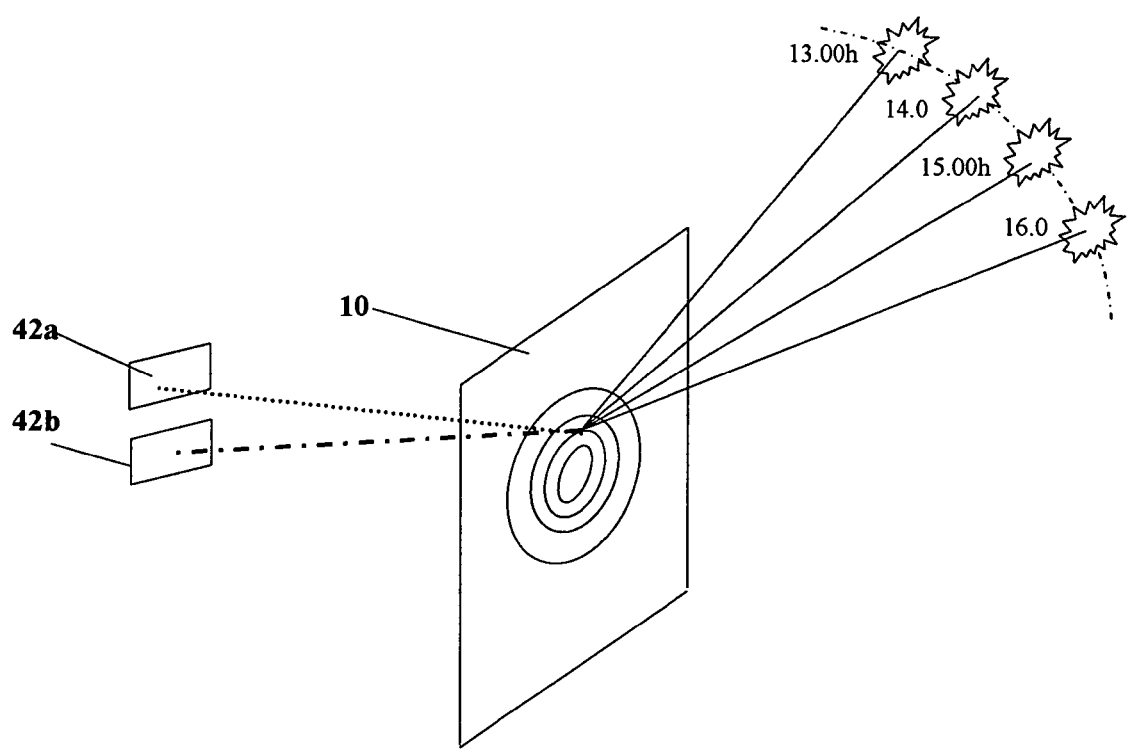
FIG. 12 illustrates a refractive solar energy concentrator system incorporating an electro-holographic lens device in accordance with a preferred embodiment of the present invention, with wavelength separation ability.

FIG. 12 illustrates a refractive solar energy concentrator system incorporating an electro-holographic lens device in accordance with a preferred embodiment of the present invention, with wavelength separation ability.

The proposed electro-holographic lens device of the present invention, incorporating RTCGHL+RTCGHT, allows building the concentrating lens on a flat substrate rather than using a parabolic design. Additionally, the transparent design allows the focus to be behind the glass so that in the Stirling Dish case, the engine can be installed on the ground in a stationary position and moreover—there will be no need to move the flat "dish" at all.

This property allows therefore directing "hot" light, Infra-Red and near wavelengths to thermal usage facility and "blue "light i.e. UV and near wavelength, to PV array without heat loading it, so that heat rejection is minimized. This property is achieved since the hologram acts as a diffraction grating. As is known, a grating separates angularly the incident electromagnetic wave (including light). The angular separation is higher as the frequency of the grating is higher, and vice versa. This principle also exists for a spectral radiation (like white light) incident on a grating. In this case every angular separation contains the whole spectrum, which is now spread like a rainbow. If the grating is linear, i.e. of a sinusoidal profile, the diffracted radiation has only three components—without diffraction, and the other two in an angular symmetry to it. However, if the grating profile is not sinusoidal, like a rectangular shape, higher orders of diffraction are obtained, in symmetry to the non-diffracted one.

Figure 13:
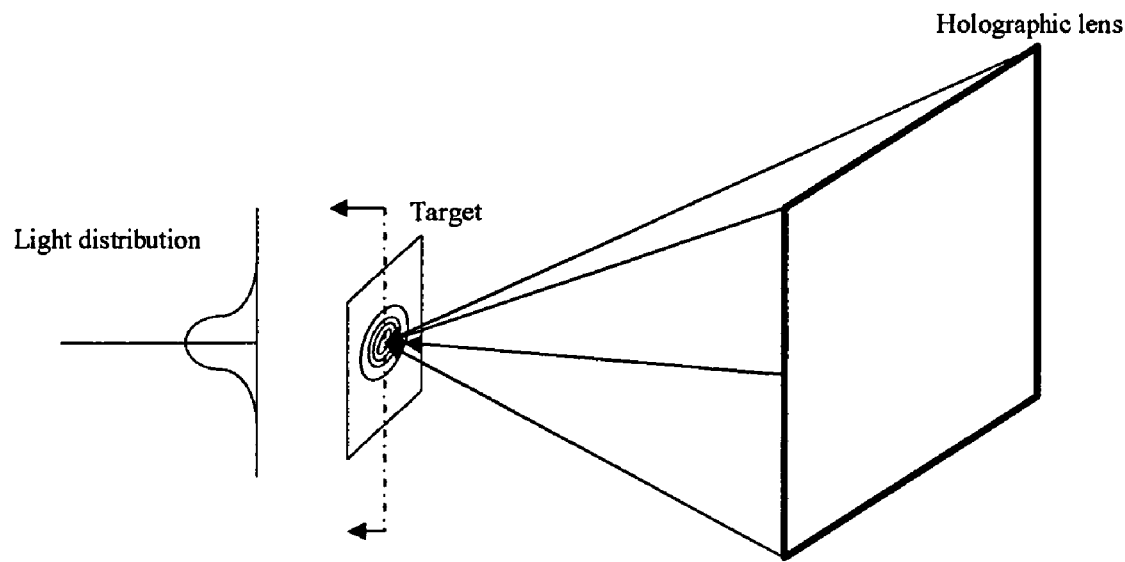
FIG. 13 illustrates a possible use of an electro-holographic lens device in accordance with the present invention, where the light distribution on the target is concentrated (thermal systems, e.g. Stirling dish).
Figure 14:
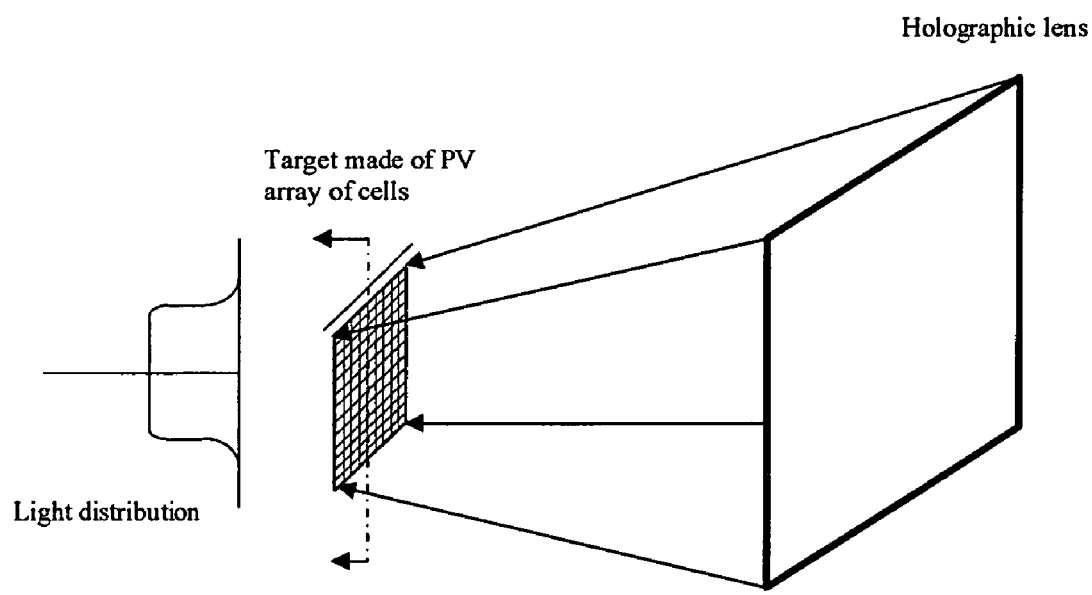
FIG. 14 illustrates a possible use of an electro-holographic lens device in accordance with the present invention, where the light distribution on the target is even over a predetermined area (e.g. an array of photovoltaic cells).

FIG. 13 illustrates a possible use of an electro-holographic lens device in accordance with the present invention, where the light distribution on the target is concentrated (thermal systems, e.g. Stirling dish). FIG. 14 illustrates a possible use of an electro-holographic lens device in accordance with the present invention, where the light distribution on the target is wide over a predetermined area (e.g. an array of PV cells).

FIG. 15 illustrates eyeglasses for vision correction or vision enhancement incorporating an electro-holographic lens device in accordance a preferred embodiment of the present invention, i.e. the RTCGHL. It is known that most of the population, which is over the age of 45 suffers from presbyopia. This is a condition that is caused by a loss in the ability to focus of the eye, due to eye degeneration. Today, this condition is treated with multi-focal eyeglasses. There are nowadays also some surgical procedures, like scleral ablation and scleral expansion, which address the presbyopia problem. The present invention proposes to reverse presbyopia, by means of a non-surgical treatment. The proposed eyeglasses incorporate electro-holographic lenses 10 (RTCGHL) in accordance with the present invention. Using these glasses it is possible to view the image of an object, which is in certain angular directions ($\alpha$, $\beta$) to the line of sight of the viewer. The lenses 52 of the eyeglasses 50 are each an electro-holographic lens device in accordance with the present invention, that act as vision correction lenses. For viewing an object, which is in a relative angular direction (or movement) to the line of sight of the observer, he will be able to locate his view on the object, without moving the head, but the eyes. This will be due to a tracking sensor 54, which may be conveniently positioned on the frame of the glasses. This tracking system provides "on line" angular positioning information" of the object, by monitoring in real-time the position of the eye. Similar tracking systems are applied in various night-vision instruments, like for pilots and especially for those performing their missions with helicopters. This information will be fed to the controlling processor and it modifies in real-time the fringe patterns of the holographic lenses—to correspond with the exact momentary angular relocation of the object.

In still another preferred embodiment, in order to obtain information about movements of the viewed object, towards or from the observer, a distance measuring device is introduced. It provides "on line" "the distance positioning information", by following the focusing condition of the eye. This information is fed also to the controlling processor, that changes in real-time the fringes' configuration of the electro-holographic lens—to correspond with the exact momentary distance position of the object. This may be an infrared (IR) combined emitter 58 and receiver 56, for transmitting IR radiation and receiving reflected IR radiation from the viewed object. Similar distance measuring systems are incorporated nowadays in photo-cameras. The controller 60 received information from these sensors and computes the correct fringe pattern that needs to be produced by the electro-holographic lens of the eyeglasses. A power supply unit 62, such as a battery, powers the system. The new eyeglasses disclosed herein allow for a full field of view (FOV), compared to the relatively narrow FOV of the multi-focal glasses.

It should be noted that the location of the components and their number in/on the frame is shown merely as a suggestion, but they can be anywhere else and even outside the frame—for example the battery.

The present invention may be also implemented in other fields too. A telescope images a point source like a star, and many times a blurred image is obtained. This phenomenon is attributed to atmospheric turbulence, which changes the refractive indices along the path of light arriving from a star. Another blurring effect is attributed to the rotation of the earth around itself (and around the sun). Therefore, when observing a star, a tracking system is incorporated with the telescope, in order to follow in real-time the angular position of the star, according to the movement of the earth. Using the electro-holographic lens device of the present invention, it is possible to image an object, which is in a certain angular directions ($\alpha$, $\beta$) to the lens axis.

In still another embodiment, if the object is in a relative angular movement to the observer, it is possible to add a tracking system that provides the angular positioning information of the object in real-time, by following the angular position of the observed star. This information is also fed to a controlling processor, that changes in real-time the holographic patterns of the device to correspond with the exact momentary angular position of the object.

Using the present invention, it is also possible to overcome the turbulence in the atmosphere causing to a random distribution of the light incident the entrance pupil of the telescope and is emitted from the observed star. Thus due to the turbulence along the path of the light, the image of the star is blurred. For this purpose the control unit operates in real-time and reacts according to the turbulence variations. The control unit may implement one of the following methods: (a) measuring variations of the spread function obtained from a reference point source due to the turbulence variations, and improving it until a point image is obtained. (b) measuring the blurred image obtained from a point source, and improving its image until a point image is obtained again.

The above-mentioned application can be also applied for binoculars and camera lenses as well.

A laser beam that propagates through the atmosphere is refracted due to variations of its spatial and temporal properties in the transversal and longitudinal directions. Therefore, a laser beam, which is directed to a certain coordinate $(x_i, y_i)$ at a distance $z_i$ from the originating source $(x_0, y_0, z_0)$, is deviated and spread over a larger area than it originates. In accurate distance measurements, like in geodesy, several properties of the atmosphere are measured at least at one point along the path. These measurements are introduced to the distance equation, and a more accurate distance is obtained.

By correcting in real-time the variations of the refractive indices of the atmosphere, the laser beam is obtained on the target without its random temporal and spatial fluctuations. An electro-holographic lens device in accordance with the present invention will correct (in anti-phase) the atmospheric deviations from its plane-wave propagation, operated by a control unit that can follow the atmospheric variations (typically in average in the range of milliseconds). Therefore the electro-holographic lens device of the present invention can be introduced as an integral part of a laser system, or in front of it—to broaden the beam—before it propagates through the atmosphere.

In still another embodiment, if the object is in a relative angular movement to the illuminating laser beam, it is possible to add a tracking system that will provide its "on line" angular positioning information". This information is also fed to a controlling processor that changes the electro-holographic lens device of the present invention configuration—to correspond with the exact momentary angular position of the object.

For many laboratory applications it is desired to change in real-time the properties of a lens—like changing its focus, or changing it from a converging (positive) lens to a diverging (negative) one; changing the direction of the focal plane (by a tilt); splitting the light with different proportions or in a different direction. All these examples are possible to achieve with holography and especially if this can be a derivative of an electro-holographic lens device of the present invention.

In still another embodiment, an experiment may require simultaneous illumination of two objects or more, or a large one. A device that consists of a RTCGH+RTCGHS is used to split the beam into two or more directions and diverge it. Moreover, if these objects are in a moving condition, the RTCGH+RTCGHS device together with an RTCGHT have the ability to follow their movements by introducing a real-time control system that follows their positions and controls every segment of this composite device in order that every part of the split beam will propagate to the proper direction.

FIG. 16 illustrates an electro-holographic lens device in accordance a preferred embodiment of the present invention, exhibiting composite splitting, diverging and converging. The electro-holographic lens device of the present invention can be used to split, diverge and converge beams simultaneously, by providing different holographic fringe-patterns in different regions of the photo-refractive material.

Figure 17:
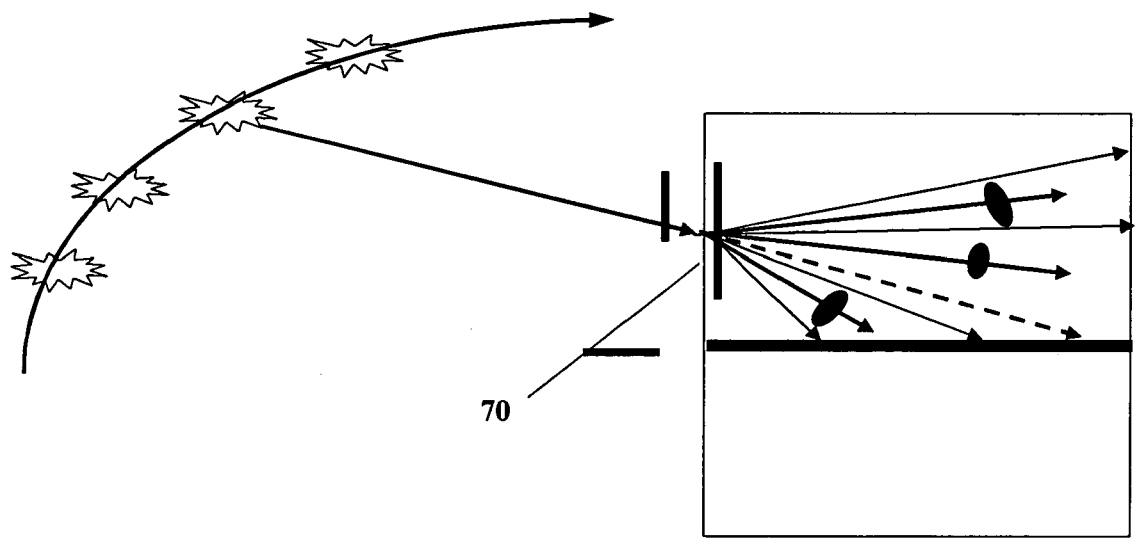
FIG. 17 illustrates incorporation of an electro-holographic lens device in a window, in accordance with a preferred embodiment of the present invention.

FIG. 17 illustrates incorporation of an electro-holographic lens device in a window, in accordance a preferred embodiment of the present invention.

If the electro-holographic lens device is incorporated in a window, where it is used for diverting direct light, illuminating specific spots (like spot lighting), or turn the window (or regions of it) into a diverging or converging lens.

It should be clear that the description of the embodiments and attached Figures set forth in this specification serves only for a better understanding of the invention, without limiting its scope as covered by the following claims.

It should also be clear that a person skilled in the art, after reading the present specification could make adjustments or amendments to the attached Figures and above described embodiments that would still be covered by the following claims.

The invention claimed is:

1. An electro-optic system for concentrating a light beam that is incident from a moving light source onto at least one predetermined target, the system comprising:
   At least one of a plurality of layers of electro-holographic lens devices comprising:
   an active layer made from a transparent photo-refractive material, whose refractive index may be locally modified by locally applying an electric field;
   an array of electrodes in a predetermined density, provided adjacent the active layer for locally providing electric fields across an array of predetermined locations in the active layer;
   a tracking unit for tracking the position of the light source;
   a control unit for applying and controlling application of electric fields in a dynamically controllable predetermined locations obtained from the tracking unit, the information relating to the location of the light source for creating a dynamically changing holographic fringe pattern across the active layer, creating a dynamically changing concentrating lens, so as to continuously focus the light beam onto the at least one predetermined target.

2. A system as claimed in claim 1, wherein the moving light source is the sun, and said at least one predetermined target comprises one or more photovoltaic cells.

3. A system as claimed in claim 1, wherein said at least one predetermined target is stationary.

4. A system as claimed in claim 1, further comprising a second tracking unit for tracking the momentary position of the at least one predetermined target, which is moving, and for providing the momentary position of the at least one predetermined target to the control unit for online amendment of the focusing of the light beam onto the momentary position of the at least one predetermined target.

5. A system as claimed in claim 1, where the active layer is provided on a substrate.

6. A system as claimed in claim 5, wherein the substrate is transparent.

7. A system as claimed in claim 5, wherein the substrate is reflective.

8. A system as claimed in claim 1, wherein the active layer is made from transparent materials.

9. A system as claimed in claim 1, wherein the active layer is made from materials selected from the group of colloidal semiconductors.

10. A system as claimed in claim 1, wherein the active layer is made from materials selected from the group comprising: $ZnO$, $WO_3$, $V_2O_5$, $Ag_2O$, $ZnS$, $CdS$, $PbS$, $CuS$, $MoS_2$, $CdSe$, $InO$ and $InSnO_x$.

11. A system as claimed in claim 1, wherein the active layer is made from materials selected from the group of electrochromic materials.

12. A system as claimed in claim 1, wherein the active layer is made from materials selected from the group of liquid crystals.

13. A system as claimed in claim 1, wherein the target comprises at least one energy transducer for transforming the irradiated energy directed from the device onto the at least one energy transducer into electricity.

14. A system as claimed in claim 13, wherein the transducer comprises a thermal conversion unit like Stirling engine.

15. A system as claimed in claim 13 wherein the transducer comprises an array of photovoltaic cells.

16. A system as claimed in claim 13, further comprising a second energy transducer, wherein the second energy transducer is sensitive to different light bandwidths from the first transducer, for receiving energy irradiations of different bandwidths.

17. A system as claimed in claim 16 whereas the second transducer is adjacent the first transducer.

18. A system as claimed in claim 1, wherein the device is incorporated in a window.

19. A system as claimed in claim 1, incorporated in eyeglasses, serving as at least one lens.

20. A system as claimed in claim 19, further comprising detection means for detecting a distance between the eyeglasses and a viewed object.

21. A system as claimed in claim 19, further comprising detection means for detecting orientation of the eyes of a bearer of the eyeglasses.

22. A system as claimed in claim 1, further comprising a beam tilting element comprising at least one of the at least one of a plurality of layers of electro-holographic lens devices.

23. A method for concentrating a light beam that is incident from a moving light source onto at least one predetermined target, the method comprising:
   providing at least one of a plurality of layers of an electro-holographic lens devices comprising:
   an active layer made from a transparent photo-refractive material, whose refractive index may be locally modified by locally applying an electric field;
   an array of electrodes in a predetermined density, provided adjacent the active layer for locally providing electric fields across an array of predetermined locations in the active layer;

a tracking unit for tracking the position of the light source;

a control unit for applying and controlling application of electric fields in a dynamically controllable predetermined locations based on information from the tracking unit on the position of the light source;

creating a dynamically changing holographic fringe pattern across the active layer thus creating a dynamically changing concentrating lens so as to continuously focus the light beam onto said at least one predetermined target.

24. A method as claimed in claim 23, wherein the moving light source is the sun, and said at least one predetermined target comprises one or more photovoltaic cells.

25. A method as claimed in claim 23, wherein said at least one predetermined target is stationary.

26. A method as claimed in claim 23, further comprising providing a second tracker and tracking the momentary position of the target using the second tracking unit for providing the momentary position of said at least one predetermined target, which is moving, to the control unit for online amendment of the focusing of the light beam onto the momentary position of the target.

27. A method as claimed in claim 23, wherein the electro-holographic lens device is refractive.

28. A method as claimed in claim 23, wherein the electro-holographic lens device is reflective.

29. A method as claimed in claim 23 wherein the created holographic lens device is made to produce two bands of frequencies, for concentrating different bandwidths on different locations.

30. A method as claimed in claim 29, wherein one target is set to occupy PV transducers and the second target occupies heat sensitive elements.

31. A method as claimed in claim 23, further comprising providing a beam tilting element comprising at least one of said at least one of a plurality of layers of the electro-holographic lens devices, and tilting the focused light beam onto the target location.

* * * * *